UNITED STATES PATENT OFFICE.

GEORGE OAKLEY, OF QUINCY, ILLINOIS.

IMPROVED COMPOSITION FOR CURING CORNS.

Specification forming part of Letters Patent No. 92,993, dated July 27, 1869.

*To all whom it may concern:*

Be it known that I, GEORGE OAKLEY, of Quincy, in the county of Adams, and in the State of Illinois, have invented a new and useful Composition for Removing Corns from the Feet; and do hereby declare that the following is a full, clear, and exact description thereof.

Of the many preparations in use for the removal of corns none are free from serious objections, arising from their liability to produce painful and often dangerous sores, which, in the end, prove more uncomfortable than were the corns. To remove these objections and produce a perfectly harmless remedy is the design of my invention, which is fully described below.

I take the buds of the balm of Gilead and saturate them with alcohol until their strength is entirely extracted, when, after straining, the tincture is ready for use.

This tincture is applied to the outer surface of the corn, which, after a few applications, is softened, so as to be easily removed, after which the cavity remaining in the toe will fill up and heal without delay, and without producing soreness.

Having thus fully set forth the nature and merits of my invention, what I claim as new, and desire to secure by Letters Patent, is—

The within-described composition or tincture, substantially as and for the purpose specified.

In testimony that I claim the foregoing I have hereunto set my hand this 14th day of June, 1869.

GEORGE OAKLEY.

Witnesses:
EBENEZER B. BARKER,
FRANK C. KENDALL.